United States Patent Office 3,686,189
Patented Aug. 22, 1972

3,686,189
3-HALOGENATED 4,4'-DISULFOXY-DIPHENYL-(2-PYRIDYL)-METHANE
Gianfranco Pala, Milan, Italy, assignor to Istituto de Angeli S.p.A., Milan, Italy
No Drawing. Continuation-in-part of application Ser. No. 638,755, May 16, 1967. This application Sept. 17, 1970, Ser. No. 73,213
Claims priority, application Italy, Dec. 14, 1966, 17,936/66, 17,937/66
The portion of the term of the patent subsequent to Jan. 26, 1988, has been disclaimed
Int. Cl. C07d 31/48
U.S. Cl. 260—294.8 R          6 Claims

ABSTRACT OF THE DISCLOSURE

Di-alkali salts of 4,4'-disulfoxy-diphenyl-(2-pyridyl)-methane of the general formula

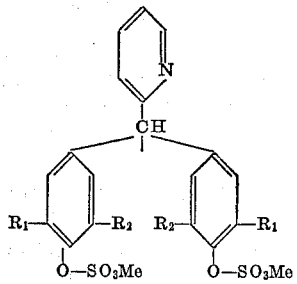

wherein $R_1$ and $R_2$ are hydrogen and Me is an alkali metal cation are provided in an especially facile manner from the corresponding 4,4'-dihydroxy compound in which at least one of the couples of substituents $R_1R_1$ and $R_2R_2$ is a halogen, preferably bromine or chlorine by: (1) reacting said hydroxy compounds with an excess of chlorosulfonic acid in the presence of an acid binding agent, such as pyridine; (2) adjusting the pH with an alkaline-reacting salt-forming agent which provides an alkaline cation such as an alkali metal hydroxide, typified by sodium hydroxide; and (3) dehalogenating the compound of (2) with a Nickel-Raney alloy.

BACKGROUND OF THE INVENTION

Field of the invention

This application is a continuation-in-part of my application Ser. No. 638,755, filed May 16, 1967 now U.S. Pat. 3,559,643.

This invention relates to a new and advantageous process for the preparation of salts of 4,4'-disulfoxydiphenyl-(2-pyridyl)-methane, an already known compound, which may be used as laxative drugs.

Description of the prior art

In our U.S.A. patent application No. 573,873/66 now U.S. Pat. 3,528,986 a method for the preparation of this product by starting from 4,4'-dioxy-diphenyl-(2-pyridyl)-methane and chlorosulfonic acid has been disclosed.

An already known method for the preparation of 4,4'-dioxy-diphenyl-(2-pyridyl)-methane consists in condensing 2-pyridinaldehyde or a reactive derivative thereof with phenol in the presence of a condensing agent. It has, however, been found that, in addition to the desired compound, such method leads to the formation of an elevated percentage (24–29%) of the unwanted isomer 2,4'-dioxy-diphenyl-(2-pyridyl)-methane, the removal of which requires subsequent crystallizations from the alcohol (at least two crystallizations). The final yields of pure product are therefore rather modest. It is pointed out that the formation of the unwanted isomer results from the fact that phenol can react not only at the 4-position but also at the 2 and 6-positions, which are ortho to the phenolic hydroxy group.

The process according to the present invention enables one to obtain the salts of 4,4'-disulfoxy-diphenyl-(2-pyridyl)-methane from starting materials, the preparation of which does not give rise, or gives rise to a noticeably minor extent, to the above-described inconveniences.

SUMMARY OF THE INVENTION

This process is characterized in that a compound of the general formula:

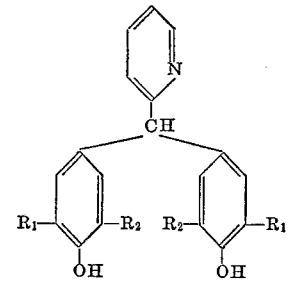

wherein the couples of substituents $R_1R_1$ and $R_2R_2$ represent a hydrogen atom or a halogen atom, at least one of the said couples of substituents representing a halogen, preferably chlorine or bromine atoms, is reacted, under anhydrous conditions, with an excess of chlorosulfonic acid at a low temperature, typically 0–80° C., in the presence of an acid-binding agent and in that the obtained compound is isolated in the form of an alkaline salt of general formula:

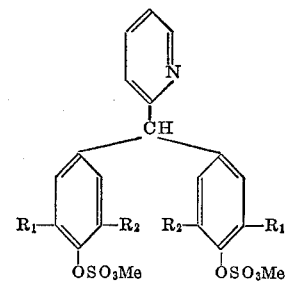

where $R_1$ and $R_2$ are as above defined and Me represents an alkali metal cation and, then is dehalogenated with Nickel-Raney (Ni.Al) alloy in the presence of caustic alkalis.

The compounds of Formula I, the preparation of which has already been described in our patent application No. 638,755/67, are obtained by condensing the corresponding phenols substituted in the 2 or 2,6 positions with 2-pyridinaldehyde or a reactive derivative thereof, with ease and with elevated yields, in that 2,6-disubstituted phenols do not form isomers and 2-substituted phenols form isomers in such quantities as to be easily eliminated by washing with boiling 95° alcohol.

Compounds of Formula I which may be used according to the present invention comprise, for instance, 3,3', 5,5'-tetrabromo-3,3',5,5'-tetrachloro, 3,3'-dichloro and 3,3'-dibromo 4,4'-dioxy-diphenyl(2-pyridyl)-methane.

According to a particular advantageous manner for carrying out the process of the present invention, an excess of chlorosulfonic acid is slowly added to a solution of a compound of Formula I kept at a temperature ranging between 0–5° C. and in the presence of anhydrous pyridine as an acid-binding agent. The reaction mixture is then gradually raised to a temperature between 45–80° C., stirred at this temperature for about seven hours, allowed to stand overnight at room temperature, and at least slowly poured into a mixture of ice and alkaline reacting salt-forming compound, providing an alkaline cation typified by an alkali metal hydroxide such as sodium hydroxide, in such a way that the solution is alkaline to the phenolphthalein. The alkaline solution is then washed with ether, filtered with charcoal, brought up to pH 7, as with 10% hydrochloric acid, washed with chloroform and, after further adjusting the pH to 7.5, as with diluted sodium hydroxide, concentrated to dryness. The residue so obtained is thoroughly washed with ether and then taken up with boiling anhydrous alcohol; the undissolved product is separated by filtration and the alcoholic solution evaporated to dryness. The crude product, obtained by evaporation of the solvent, may be used for the subsequent dehalogenation without further purifications. If desired, the product may be purified by redissolving in anhydrous alcohol, by filtering with charcoal, by precipitating with chloroform, by thoroughly washing the viscous product obtained with chloroform and at least by triturating with anhydrous ether.

The crude product obtained as above described is then dehalogenated, in a solution of diluted sodium hydroxide, with Nickel-Raney alloy at room temperature during about 3–5 hours and thereafter stirred overnight at room temperature.

After filtration, the obtained alkaline solution is brought up to pH 7.5 as with 10% hydrochloric acid, filtered and evaporated to dryness under reduced pressure, preferably with a thin layer concentrator. The dry residue is taken up with anhydrous alcohol and the obtained alcoholic solution is filtered and concentrated till incipient crystallization of the product is reached.

DESCRIPTION OF THE PREFERRED EMBODIMENTS

In the following examples, pyridine is used as an acid-binding agent, for amines, especially tertiary amines, are preferred as acid-binding agents such as, in addition to pyridine, quinoline, dimethylaniline, trimethylamine, etc., but it will be clear that other acid-binding agents also will serve to bind acids.

The following examples are given by way of illustration, only:

EXAMPLE 1

(a) Disodium 3,3'-dichloro-4,4'-disulfoxy-diphenyl-(2-pyridyl)-methane 5.05 g. (0.0433 mole) of chlorosulphonic acid are dropped during 10 minutes into a solution of 5 g. (0.0144 mole) of 3,3'-dichloro-4,4'-dioxy-diphenyl-(2-pyridyl)-methane in 35 ml. of anhydrous pyridine, the temperature being maintained at 0–5° C. by external cooling. A brown precipitate is thus obtained. The mixture is gently heated for 7 hours at 45–50° C. with stirring, then it is allowed to stand overnight at room temperature. The solution obtained is poured into 140 ml. of water/ice containing 20 ml. of 30% sodium hydroxide. The final pH of the solution is >9. The solution is washed with ether, filtered with charcoal, brought to pH 7 with 15% hydrochloric acid, washed with chloroform, adjusted to pH 7.5 and at last concentrated to dryness under reduced pressure. The solid residue obtained is finely crushed with ether, dried and taken up with 200 ml. of boiling anhydrous alcohol. After filtration of the insoluble portion, the alcoholic solution is filtered with charcoal and evaporated under reduced pressure thus obtaining 7.2 g. of product (yield 90%). The product may be used for the subsequent reaction without further purification.

The crude product may be purified by redissolving in anhydrous alcohol, filtering with charcoal, precipitating with chloroform, decanting the solvent, washing the viscous product obtained with fresh chloroform and at last triturating with anhydrous ether.

The product is an ivory-white solid, M.P. 248.5–251° C. dec.

Analysis.—Found (percent): C, 37.11; H, 2.42; N, 2.46; S, 10.95; Na, 8.11; Cl, 12.21. Calcd. for $C_{18}H_{11}O_8Cl_2NS_2Na_2$ (with 4.1% of $H_2O$): C, 37.64; H, 2.38; N, 2.48; S, 11.18; Na, 8.02; Cl, 12.37.

(b) Disodium 4,4'-disulfoxy-diphenyl-(2-pyridyl)-methane 3.7 g. of Nickel-Raney alloy are added, during 4 hours, to a solution of 10 g. (0.0182 mole) of crude disodium 3,3'-dichloro - 4,4' - disulfoxy - diphenyl - (2 - pyridyl)-methane in 75 ml. of 5% sodium hydroxide, with vigorous stirring and at room temperature. The mixture is then stirred overnight at room temperature and the undissolved portion is filtered off. The solution, filtered with charcoal is brought to pH 7.5 with 10% hydrochloric acid, filtered again and at least evaporated to dryness with a thin layer concentrator.

The dry residue so obtained is taken up with about 150 ml. of boiling anhydrous alcohol and the alcoholic solution is concentrated till incipient crystallization. The disodium 4,4'-disulfoxy-diphenyl-(2-pyridyl)-methane is obtained as a white crystalline solid, M.P. 272–275° C. dec. (Yield: 68%.)

Analysis.—Found (percent): C, 42.31; H, 3.21; N, 2.76; S, 11.90; Na, 8.92. Calcd. for $C_{18}H_{13}O_8NS_2Na_2$ (with 6.5% of $H_2O$): C, 41.97; H, 3.26; N, 2.71; S, 12.44; Na, 8.93.

EXAMPLE 2

(a) Disodium 3,3'-dibromo-4,4'-disulfoxy-diphenyl-(2-pyridyl)-methane

By starting from 5 g. (0.01154 mole) of 3,3'-dibromo-4,4'-dioxy-diphenyl-2(2-pyridyl)-methane, 35 ml. of anhydrous pyridine, 4.04 g. (0.0346 mole) of chlorosulphonic acid and by proceeding as described in Example 1a, 5.5 g. of crude product (yield 74%) are obtained. The product may be purified as above described or by crystallization from anhydrous alcohol. The disodium 3,3'-dibromo-4,4'-disulfoxy-diphenyl-(2 - pyridyl)-methane is a white crystalline solid, M.P. 239–240° C. dec.

Analysis.—Found (percent): C, 32.66; H, 2.17; N, 2.08; S, 9.51; Na, 6.94; Br, 24.31. Calcd. for

$C_{18}H_{11}O_8Br_2NS_2Na_2$ (with 3.78% of $H_2O$): C, 32.50; H, 2.09; N, 2.10; S, 9.64; Na, 6.92; Br, 24.03.

(d) Disodium 4,4'-disulfoxy-diphenyl-(2-pyridyl)-methane

By starting from 11.6 g. (0.0182 mole) of crude disodium 3,3'-dibromo-4,4'-disulfoxy-diphenyl-(2-pyridyl)-methane, 75 ml. of 5% sodium hydroxide, 3.7 g. of Nickel-Raney alloy and proceeding as described in Example 1b, the product is obtained in 70% yield.

The 3,3'-dibromo - 4,4' - dioxy-diphenyl-(2-pyridyl)-methane used in (a) hereof may be obtained, for instance, as shown in Example 3 of my U.S. application Ser. No. 638,755.

EXAMPLE 3

(a) Disodium 3,3', 5,5'-tetrachloro-4,4'-disulfoxy-diphenyl-(2-pyridyl)-methane 4.21 g. (0.0361 mole) of chlorosulphonic acid are added during 10 minutes to 5 g. (0.012 mole) of 3,3', 5,5'-tetrachloro-4,4'-dioxy-diphenyl - (2 - pyridyl) - methane in 35 ml. of anhydrous pyridine, the temperature being maintained between 0 and 5° C. by external cooling. The mixture is heated for 7 hours at 75–80° C. and then worked up as described in Example 1a.

The crude product is isolated by evaporation to dryness of the alcoholic solution (yield 41%) and it may be purified as described in Example 1a. The disodium 3,3', 5,5'- tetrachloro-4,4'-disulfoxy - diphenyl-(2-pyridyl)-methane is a pale yellow colored solid, M.P. 212–220° C. dec.

*Analysis.*—Found (percent): C, 33.09; H, 1.94; N, 2.09; S, 9.73; Na, 7.08; Cl, 21.54. Calcd. for $$C_{18}H_9O_8Cl_4NS_2Na_2$$

(with 3.9% of $H_2O$): C, 33.54; H, 1.85; N, 2.17; S, 9.95; Na, 7.14; Cl, 22.02.

(b) Disodium 4,4'-disulfoxy-diphenyl-(2-pyridyl)-methane

By starting from 11.26 g. (0.00182 mole) of crude disodium 3,3', 5,5' - tetrachloro-4,4'-disulfoxy-(2-pyridyl)-methane, 75 ml. of 5% sodium hydroxide, 3.7 g. of Nickel-Raney alloy and proceeding as described in Example 1b, the product is obtained with yields of 55%.

The 3,3', 5,5' - tetrachloro-4,4'-dioxy-diphenyl-(2-pyridyl)-methane used in (a) hereof may be obtained, for instance, as shown in Example 2 of my U.S. application Ser. No. 638,755.

EXAMPLE 4

(a) Disodium 3,3', 5,5'-tetrabromo-4,4'-disulfoxy-diphenyl-(2-pyridyl)-methane

By starting from 5 g. (0.00843 mole) of 3,3', 5,5'-tetrabromo-4,4'-dioxy-diphenyl-(2 - pyridyl)-methane, 35 ml. of anhydrous pyridine and 2.95 g. (0.0253 mole) of chlorosulphonic acid and proceeding as described in Example 3a, the disodium 3,3', 5,5'-tetrabromo - 4,4' - disulfoxy-diphenyl-(2-pyridyl)-methane is obtained (yields in crude product 38%). The product is a yellow solid, M.P. 180–200° C. dec.

*Analysis.*—Found (percent): C, 25.88; H, 1.61; N, 1.64; S, 7.59; Na, 5.44; Br, 28.01. Calcd. for $$C_{18}H_9O_8Br_4NS_2Na_2$$

(with 4.17% of $H_2O$): C, 26.00; H, 1.55; N, 1.69; S, 7.72; Na, 5.53; Br, 38.43.

(b) Disodium 4,4'-disulfoxy-diphenyl-(2-pyridyl)-methane

By starting from 14.5 g. (0.0182 mole) of crude disodium 3,3',5,5'-tetrabromo - 4,4' - disulfoxy-diphenyl-(2-pyridyl)-methane, 75 ml. of 5% sodium hydroxide, 3.7 g. of Nickel-Raney alloy and proceeding as described in Example 1b, the product is obtained in 62% yield.

The 3,3',5,5'-tetrabromo - 4,4' - dioxy-diphenyl-(2-pyridyl)-methane used in (a) hereof may be obtained for instance, as shown in Example 4 of my U.S. application Ser. No. 638,755.

What is claimed is:
1. The compounds of general formula:

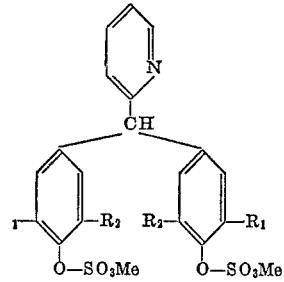

where $R_1$ and $R_2$ may be the same or different and represent a halogen or hydrogen atom and at least one of the substituents $R_1$ or $R_2$ is a halogen and Me represent an alkali metal cation.

2. The compounds of claim 1, where Me represents the sodium cation.

3. A compound as defined in claim 1, disodium 3,3'-dichloro-4,4'-disulfoxy-diphenyl-(2-pyridyl)-methane.

4. A compound as defined in claim 1, disodium 3,3'-dibromo-4,4'-disulfoxy-diphenyl-(2-pyridyl)-methane.

5. A compound as defined in claim 1, disodium 3,3', 5,5' - tetrachloro - 4,4' - disulfoxy - diphenyl-(2-pyridyl)-methane.

6. A compound as defined in claim 1, disodium 3,3', 5,5' - tetrabromo - 4,4' - disulfoxy - diphenyl-(2-pyridyl)-methane.

References Cited

UNITED STATES PATENTS 3,528,986   9/1970   Pala _____ 260—294.8
3,558,643   1/1971   Pala _____ 260—294.8

ALAN L. ROTMAN, Primary Examiner

U.S. Cl. X.R.

260—297 R; 424—263

UNITED STATES PATENT OFFICE
CERTIFICATE OF CORRECTION

Patent No. 3,686,189    Dated August 22, 1972'

Inventor(s) GIANFRANCO PALA

It is certified that error appears in the above-identified patent and that said Letters Patent are hereby corrected as shown below:

In Claim 1, the lower left ring in the drawing should read:

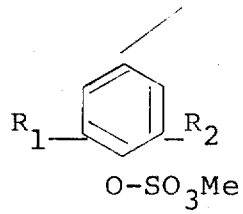

Signed and sealed this 20th day of February 1973.

(SEAL)
Attest:

EDWARD M. FLETCHER, JR.
Attesting Officer

ROBERT GOTTSCHALK
Commissioner of Patents